June 20, 1961 P. JOHANNSEN 2,989,301
SPRING ARRANGEMENT FOR VEHICLES
Filed April 20, 1959
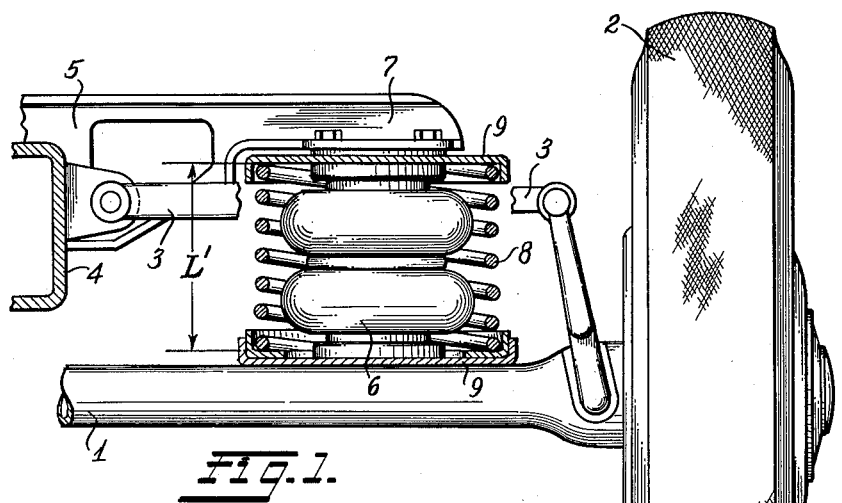
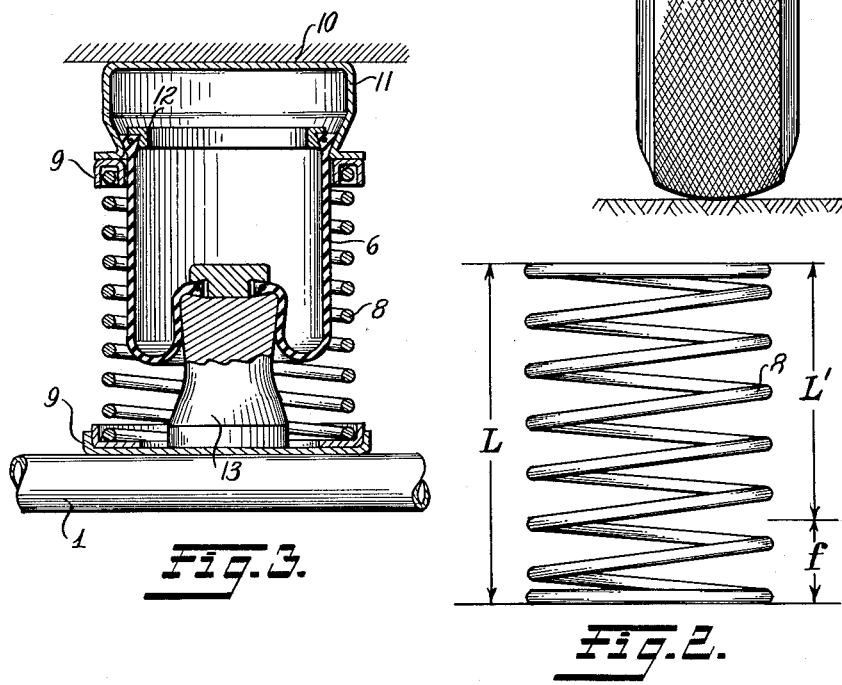
INVENTOR.
Peter Johannsen
BY
Patent AGENT 2,989,301
SPRING ARRANGEMENT FOR VEHICLES
Peter Johannsen, Hannover, Germany, assignor to Continental Gummi-Werke Aktiengesellschaft, Hannover, Germany
Filed Apr. 20, 1959, Ser. No. 807,508
Claims priority, application Germany Apr. 23, 1958
4 Claims. (Cl. 267—34)

The present invention relates to a spring arrangement for vehicles, according to which between the vehicle chassis and the respective vehicle wheel or axle thereof there is arranged an air spring with variable spring value. A spring of this general type has heretofore been suggested which includes an air spring with variable spring value and a leaf spring between the vehicle wheel or its axle and the vehicle chassis, the leaf spring when not yet deflected from its normal length by the load of the vehicle being under such a pre-tension or pre-load that its pre-load or the bend $f$ for bringing about said pre-load will equal or approximately equal the value of $$\frac{A}{V^2}$$

A equalling $$\frac{g}{4\pi^2}$$

In the above equations, V represents the natural or fundamental frequency of the vehicle, whereas $g$ indicates the acceleration due to gravity. When employing the centimeter—second system, the value A may be approximately assumed to equal 25.

The above suggestion is based on the following considerations:

With vehicles, above all when employed for carrying persons or a greater load, a certain natural or fundamental frequency is required which will be independent of the load. The natural or fundamental frequency V is determined by the formula $$V = \frac{1}{2\pi}\sqrt{\frac{g \times C}{G}}$$

In this equation, the spring rate C represents the total of the spring rates of the air bellows ($C_{air\ bellows}$) and of the leaf spring ($C_{spring}$). Whereas the spring rate of the leaf spring is constant, and, therefore, will disturb the condition $V = $ constant when the vehicle weight G due to a changing load will vary, and only the spring rate of the air bellows is adapted due to its pressure control to be brought into conformity with the respective load.

In this connection, the harmful influence of the leaf spring with regard to the desired load independent natural frequency will be compensated for by imparting upon the leaf spring pre-tension so that $f$ will equal $$\frac{A}{V^2}$$

By varying the spring rate of the air spring bellows, the spring rate can be adapted to the respective load so that at each condition of load, the total of the spring values ($C_{spring}$, $C_{air\ bellows}$) the desired natural or fundamental frequency will be assured.

It is an object of the present invention to provide a spring arrangement for cushioning vehicles by means of an air spring, in connection with which any type other than leaf springs may successfully be employed.

It is another object of this invention to provide a spring arrangement of the type set forth in the preceding paragraph, which will require a minimum of space.

These and other objects and advantages of the invention will appear more clearly from the following specification in connection with the accompanying drawings, in which:

FIG. 1 illustrates a wheel spring system for a street vehicle.

FIG. 2 illustrates a not yet installed helical spring for use in connection with the spring system of FIG. 1.

FIG. 3 is a section through a modified spring arrangement for use in connection with a vehicle.

According to the present invention, it has been found that the air spring may for instance be equipped with a helical spring designed as tension or pressure spring for cooperation therewith, preferably if a particularly simple and space-saving unit for instance for use in motor vehicles is desired and perhaps also a reduction in weight. The air spring together with the helical spring can easily be mounted in a vehicle. Reference may also be made to the emergency properties of helical springs, especially if the air spring should for some reason become defective.

Wherever a low overall height and a maximum distribution of the spring forces over a minimum of space is desired, the helical spring may selectively be replaced by disc springs, conical springs or the like. Also the employment of a rubber spring, i.e. the insertion of an attenuated or damped spring will be possible.

Nowadays also torsion springs in form of torsion rods are being employed instead of leaf springs for cushioning vehicles. When combining an air spring with a torsion spring, no additional structural elements are necessary. This type of spring is very foolproof. In addition to a favorable spring effect, it can advantageously be employed with military vehicles wherever a particularly good position of the vehicle is desired.

Referring now to the drawing in detail, the rear axle of a vehicle which may for instance be designed as jointed across shaft is designated with the reference numeral 1 and carries two wheels 2 (one only being shown) of a motor car. The rear axle 1 is by means of tie-rods 3 connected to the chassis 4 or with the transverse beam of a self-supporting vehicle.

The cushioning of the vehicle is brought about by an air spring or bellows 6 mounted between the vehicle axle 1 and the supporting body or vehicle frame 7. The bellows 6 may for instance be designed as folding bellows in conformity with the showing of FIG. 1. The ends of said bellows are in a manner known per se fixedly connected to parts 1 and 7 to be cushioned relative to each other. Another possibility consists in designing the air spring as roller bellows as shown in FIG. 3.

The spring unit furthermore comprises a helical spring 8 of steel or the like which is arranged similar to bellows 6 and has its upper portion rest against frame 7, whereas the lower portion of helical spring 8 rests against the spring disc 9 connected to axle 1.

The helical spring 8 which in non-installed condition has a length L (FIG. 2) will when being installed be compressed by the amount $$f = \frac{A}{V^2}$$

to such an extent that without being compressed by a load carried by the vehicle, in other words while the vehicle is empty, it will carry a considerable portion of the load or the entire load on the wheel. With useful load, i.e. when carrying persons or other loads, the increased load will be carried in part by the air spring or bellows 6. The pressure within the bellows 6 is controlled by control elements such as compensating valves (not shown) and by conduits in conformity with the load so that the distance L' will remain constant at various loads.

FIG. 3 shows a somewhat modified spring unit of a street vehicle which spring unit is mounted between the axle 1 and the chassis 10. The bottom of cup 11 is fixedly connected to chassis 10 in any convenient manner for instance by screws and sealing means. Between the lower portion of cup 11 and a supporting ring 12 there is connected the upper end of the air spring 6, while the lower end rests against a piston 13. Bellows 6 is again combined with a helical spring 8 which latter rests against spring disc 9. Also in this instance spring 8 will be installed under pre-load.

It is, of course, to be understood that the present invention is, by no means, limited to the particular constructions shown in the drawing but also comprises any modifications within the scope of the appended claims. Thus, instead of the illustrated air spring-helical spring combination, any other type of spring may be combined with the air spring. Also a plurality of spring types may at the same time be combined with an air spring bellows.

What I claim is:

1. In a spring system for a vehicle having a chassis and a wheel axle: an air spring having a variable spring rate and being interposed between said chassis and said wheel axle, and a coil spring likewise interposed between said chassis and said vehicle axle, with said vehicle at its normal height said coil spring being so deflected that the deflection of said coil spring equals at least approximately $$\frac{A}{V^2}$$

wherein A equals $$\frac{g}{4\pi^2}$$

$g$ indicating the acceleration due to gravity, and V indicating the desired natural frequency of the entire spring system.

2. A spring system according to claim 1, in which said coil spring is so deflected that the load carried thereby at best equals the wheel load minus the pay load.

3. In a spring arrangement for vehicles according to claim 1, in which the coil spring surrounds the air spring.

4. In a spring system for a vehicle having a chassis and a wheel axle: an air spring having a variable spring rate and being interposed between said chassis and said wheel axle, and a spring having a constant spring rate likewise interposed between said chassis and said vehicle axle, with said vehicle at its normal height said second named spring being so deflected that the deflection of said second named spring equals at least approximately $$\frac{A}{V^2}$$

wherein A equals $$\frac{g}{4\pi^2}$$

$g$ indicating the acceleration due to gravity, and V indicating the desired natural frequency of the entire spring system.

References Cited in the file of this patent

UNITED STATES PATENTS

| 2,257,913 | Maranville | Oct. 7, 1941 |
| 2,361,575 | Thompson | Oct. 31, 1944 |
| 2,391,120 | Berthelmann | Dec. 18, 1945 |
| 2,790,650 | Boschi | Apr. 30, 1957 |

FOREIGN PATENTS

| 1,152,494 | France | Sept. 2, 1957 |